US011698829B2

United States Patent
Aradhya et al.

(10) Patent No.: US 11,698,829 B2
(45) Date of Patent: Jul. 11, 2023

(54) IDENTIFYING ROOT CAUSES OF SOFTWARE DEFECTS

(71) Applicant: KYNDRYL, INC., New York, NY (US)

(72) Inventors: Siddalinga Aradhya, Bengaluru (IN); Manu Shivanna, Bangalore (IN); Rajesh Ganji, Bengaluru (IN); Abdul Kareem A Lakkundi, Gadag (IN); Abdul Karimulla Shakhadari Mohammed, Kovvur (IN)

(73) Assignee: Kyndryl Inc., New York, NY (US)

( * ) Notice: Subject to any disclaimer, the term of this patent is extended or adjusted under 35 U.S.C. 154(b) by 208 days.

(21) Appl. No.: 17/401,446

(22) Filed: Aug. 13, 2021

(65) Prior Publication Data

US 2023/0057720 A1 Feb. 23, 2023

(51) Int. Cl.
G06F 11/00 (2006.01)
G06F 11/07 (2006.01)
(Continued)

(52) U.S. Cl.
CPC ...... *G06F 11/0793* (2013.01); *G06F 11/0706* (2013.01); *G06F 11/079* (2013.01);
(Continued)

(58) Field of Classification Search
CPC .............. G06F 11/008; G06F 11/0703; G06F 11/0706; G06F 11/0772; G06F 11/079;
(Continued)

(56) References Cited

U.S. PATENT DOCUMENTS 6,163,858 A * 12/2000 Bodamer .............. G06F 11/366
717/124
6,216,237 B1 * 4/2001 Klemm ............... G06F 11/3644
714/E11.21
(Continued)

FOREIGN PATENT DOCUMENTS

EP 1868100 A2 * 12/2007 .......... G06F 11/0784

OTHER PUBLICATIONS

A. Khan and S. N. Ahsan, "Predicting bug inducing source code change patterns," 2016 International Conference on Open Source Systems & Technologies (ICOSST), Lahore, Pakistan, 2016, pp. 29-35, doi: 10.1109/ICOSST.2016.7838573. (Year: 2016).*

G. Pereira, R. Barbosa and H. Madeira, "Practical Emulation of Software Defects in Source Code," 2016 12th European Dependable Computing Conference (EDCC), Gothenburg, Sweden, 2016, pp. 130-140, doi: 10.1109/EDCC.2016.19. (Year: 2016).*

(Continued)

*Primary Examiner* — Anthony J Amoroso
(74) *Attorney, Agent, or Firm* — Erik Swanson; Matthew M. Hulihan; Heslin Rothenberg Farley & Mesiti PC

(57) ABSTRACT

Root cause identification of a software defect includes identifying, in program code of a software feature, hedge code of the software feature based on errors induced from temporarily substituting program code of the software feature with substitute program code and obtaining an error graph for the hedge code, obtaining error logs of an application that incorporates the software feature, the error logs indicating errors with the software feature of the application, automatically generating an application error graph reflective of the errors with the software feature of the application, mapping the application error graph to the error graph for the hedge code, and based on the mapping aligning one of more errors reflected in the application error graph to error(s) reflected in the error graph for the hedge code, identifying the hedge code as inducing a root error identified in the application error graph.

20 Claims, 9 Drawing Sheets

(51) Int. Cl.
  *G06F 11/30* (2006.01)
  *G06F 11/36* (2006.01)
(52) U.S. Cl.
  CPC ........ *G06F 11/0772* (2013.01); *G06F 11/302* (2013.01); *G06F 11/362* (2013.01); *G06F 11/3624* (2013.01)
(58) Field of Classification Search
  CPC .. G06F 11/0793; G06F 11/302; G06F 11/362; G06F 11/3624; G06F 11/3644; G06F 11/3664; G06F 11/3668
  See application file for complete search history.

(56) References Cited

U.S. PATENT DOCUMENTS

| | | | |
|---|---|---|---|
| 8,079,018 B2 | 12/2011 | Huene et al. | |
| 8,943,478 B2 * | 1/2015 | Artzi | G06F 11/3612 717/127 |
| 9,195,555 B2 * | 11/2015 | Kalayci | G06F 11/3688 |
| 9,298,525 B2 * | 3/2016 | Zhu | G06Q 10/0639 |
| 9,652,366 B2 | 5/2017 | Sivanesan | |
| 10,311,405 B2 * | 6/2019 | Burton | G06Q 10/103 |
| 10,552,302 B2 | 2/2020 | Jain et al. | |
| 11,061,805 B2 * | 7/2021 | Loyola | G06F 11/3616 |
| 11,176,015 B2 * | 11/2021 | Rallapalli | G06F 11/3068 |
| 2013/0311972 A1 | 11/2013 | Supplisson et al. | |

OTHER PUBLICATIONS

S. Kim, T. Zimmermann, K. Pan and E. J. Jr. Whitehead, "Automatic Identification of Bug-Introducing Changes," 21st IEEE/ACM International Conference on Automated Software Engineering (ASE'06), Tokyo, Japan, 2006, pp. 81-90, doi: 10.1109/ASE.2006.23. (Year: 2006).*

B. Sun, R.-Y. Chang, X. Chen and A. Podgurski, "Automated Support for Propagating Bug Fixes," 2008 19th International Symposium on Software Reliability Engineering (ISSRE), Seattle, WA, USA, 2008, pp. 187-196, doi: 10.1109/ISSRE.2008.29. (Year: 2008).*

Rodriguez-Perez et al., "How bugs are born: a model to identify how bugs are introduced in software components", Empirical Software Engineering, Feb. 4, 2020, pp. 1294-1340.

Kataoka et al., "The Analyzing Method of Root Causes for Software Problems", SEI Technical Review, No. 73, Oct. 2011, pp. 81-85.

Lal et al., "Root cause analysis of software bugs using machine learning techniques", 2017 7th International Conference on Cloud Computing, Data Science & Engineering—Confluence, Jan. 13, 2017, pp. 105-111.

Nguyen et al., "Using Topic Model to Suggest Fine-Grained Source Code Changes", 2016 IEEE International Conference on Software Maintenance and Evolution, Oct. 7, 2016, pp. 200-210.

Mell, Peter, et al., "The NIST Definition of Cloud Computing", NIST Special Publication 800-145, Sep. 2011, Gaithersburg, MD, 7 pgs.

* cited by examiner

US 11,698,829 B2

IDENTIFYING ROOT CAUSES OF SOFTWARE DEFECTS

BACKGROUND

Often the codebase of a software product grows over time from a relatively small amount of program code to something much bigger, sometimes millions of lines of code. Along the way, potentially hundreds or thousands of developers may have contributed code additions, deletions, or modifications, and many such developers might no longer be involved in project. Meanwhile, software development is akin to ecosystem in which a change to one element could have significant impacts on other elements. For instance, removal or modification of even a single piece of critical code could have catastrophic effects on the functionality of the software and potentially other applications having dependencies or other cooperation with the software. Many customer/end-user bugs are inadvertently introduced due to code changes across versions or releases of the software.

SUMMARY

Shortcomings of the prior art are overcome and additional advantages are provided through the provision of a computer-implemented method. The method identifies, in program code of a software feature, hedge code of the software feature based on errors induced from temporarily substituting program code of the software feature with substitute program code. The method obtains an error graph for the hedge code, the error graph for the hedge code reflecting cause-and-effect relationships between errors induced from changes to the hedge code of the software feature. The method also obtains error logs of an application that incorporates the software feature. The error logs indicate errors with the software feature of the application. The method additionally automatically generates an application error graph reflective of the errors with the software feature of the application. The method maps the application error graph to the error graph for the hedge code. Additionally, the method, based on the mapping aligning one of more errors reflected in the application error graph to one or more errors reflected in the error graph for the hedge code, identifies the hedge code as inducing a root error identified in the application error graph.

Further, a computer system is provided that includes a memory and a processor in communication with the memory, wherein the computer system is configured to perform a method. The method identifies, in program code of a software feature, hedge code of the software feature based on errors induced from temporarily substituting program code of the software feature with substitute program code. The method obtains an error graph for the hedge code, the error graph for the hedge code reflecting cause-and-effect relationships between errors induced from changes to the hedge code of the software feature. The method also obtains error logs of an application that incorporates the software feature. The error logs indicate errors with the software feature of the application. The method additionally automatically generates an application error graph reflective of the errors with the software feature of the application. The method maps the application error graph to the error graph for the hedge code. Additionally, the method, based on the mapping aligning one of more errors reflected in the application error graph to one or more errors reflected in the error graph for the hedge code, identifies the hedge code as inducing a root error identified in the application error graph.

Yet further, a computer program product including a computer readable storage medium readable by a processing circuit and storing instructions for execution by the processing circuit is provided for performing a method. The method identifies, in program code of a software feature, hedge code of the software feature based on errors induced from temporarily substituting program code of the software feature with substitute program code. The method obtains an error graph for the hedge code, the error graph for the hedge code reflecting cause-and-effect relationships between errors induced from changes to the hedge code of the software feature. The method also obtains error logs of an application that incorporates the software feature. The error logs indicate errors with the software feature of the application. The method additionally automatically generates an application error graph reflective of the errors with the software feature of the application. The method maps the application error graph to the error graph for the hedge code. Additionally, the method, based on the mapping aligning one of more errors reflected in the application error graph to one or more errors reflected in the error graph for the hedge code, identifies the hedge code as inducing a root error identified in the application error graph.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
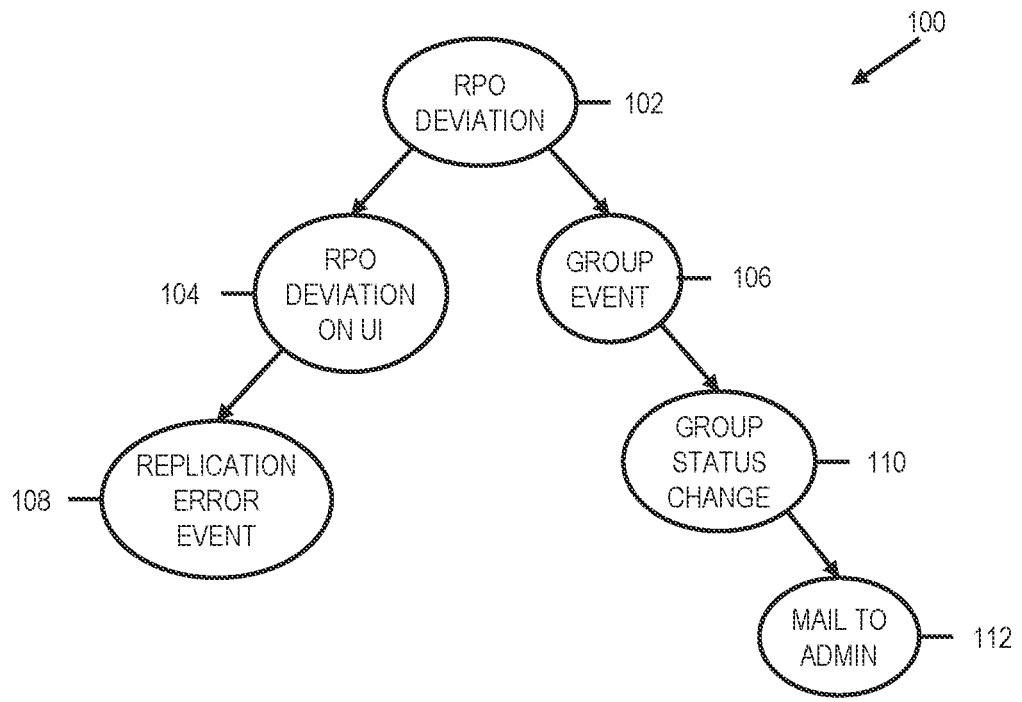
FIG. 1 depicts an example hedge code error graph induced from code substitution in accordance with aspects described herein.

It can be difficult and laborious to identify and track the changes that caused bugs or other defects in software, in part due to the ecosystemic nature of software development. Consequently, it can consume significant resources (time, individuals, meetings, etc.) to identify a root cause of a bug and fix it. Described herein are aspects to assist in identifying the root cause of the bugs/defects and help alleviate the above-noted difficulties routinely experienced in software life cycles.

The occurrence of an event has its causes and effects. Looking deeper into the causes, one can often identify a 'root', or initiating, cause of the event. For example, an observed event might be caused by another event or occurrence that itself was caused due to an improper foundational computation. The improper foundational computation might not stand out as the issue at first glance. Nevertheless, a fix to the foundational computation might eliminate the intervening cause, which in turn eliminates the occurrence of the observed event and addresses the problem that was observed.

A bug/defect in written software program code might similarly be traced back to a root cause. Bugs could be traced back to (i) removal of program code, (ii) modification of existing program code, (iii) addition of a new piece of program code, and/or (iv) design issues in the codebase, as examples. Often the root cause is centered around the first three of these examples, i.e. changes to program code of the application. Meanwhile, and even with proper version control in place, organizational attrition causes a knowledge gap resulting in difficulty understanding why code was previously modified. Aspects presented herein can be used to efficiently trace-back bugs to program code changes that are likely its root cause and suggest to the developer the relevant piece of code on which to focus. Optionally, a history of the piece of identified program code—past changes and other artifacts, for instance—can also be provided to aid a developer in resolving the root cause.

Processes discussed herein are referred to collectively as a 'Hedgestone' method. In one aspect, this provides a new approach for coding and testing systems using the following methods. Developers coding a software feature, for instance writing code directed to a user story or other task, identify the hedge or key code of that application feature. Code can be written to eliminate corner cases, provide debug information, etc., but often the key or critical aspect of a feature can be embodied in a relatively small piece of code termed herein 'hedge' code. For example, in code to calculate a Recovery Point Objective (RPO), which refers to how much data can be lost before the enterprise receives significant harm, also known as enterprise's loss tolerance, a foundationally important piece of that code (the hedge code) can be identified. Using the following example, the example RPO calculation is determined and pseudo-coded as follows:

```
-Obtain the primary server timestamp;
-Convert the primary server timestamp;
-Check the latest backup or log reply time;
-Check for the proper format (and convert to proper format if necessary);
-Calculate RPO as (log reply time - primary time stamp);
-Update the dashboard or other user-interface that an administrator or customer uses for RPO.
```

A major job in this example is to fetch the backup or log reply time stamp and if that piece of code is missing or changed then the code will not work. Take a case where the code to fetch the log reply time is modified and returns a wrong value or otherwise fails: modifying this piece of code may result in eventual failures or other errors in potentially several other features of the application. A problem with a hedge piece of code can have a cascading effect in this manner. A wrong value for RPO could propagate and cascade into a larger set of issues with other features of the software and in terms of further errors/events. A wrong RPO value can cause RPO deviation in the user interface, raising an event, a change in group status, and an electronic communication to be sent to the administrator to take corrective action, as examples. This is a relatively basic example; more complex examples might cascade into potentially tens or hundreds of associated errors.

Accordingly, an example process identifies various hedge codes of software features of a software product/application through code substitution and testing to generate error graphs associated with the hedge codes. When a bug is detected in the software, the process obtains error log(s) reflecting the bug errors and constructs application error graph(s) from the logs, the application error graphs tracing the errors and causes thereof from the software logs. A process attempts to map an application error graph to previously constructed error graph(s) that are associated with specific hedge codes in the software and identify a proper mapping to identify the key/root cause of a bug or defect and the associated hedge code for that root cause. The process identifies that to a developer to focus the developer to that piece of hedge code and assist in addressing the bug, for instance to develop a fix. Past actions with respect to that hedge code, for instance any recent modifications made to it, might suggest what introduced the error and/or potential fixes, which could be as basic as reverting to a prior code version of the hedge code portion and/or software feature in which it is contained.

Further details of the Hedgestone method are now provided. Initially, each software module can be subdivided into distinct features/microcode that are considered independently, akin to microservices. For each feature, a method identifies a hedge/key/critical function, work, or calculation that that feature performs and identifies in the program code of the software feature the corresponding hedge code for that aspect.

The identification of the hedge code for the feature can be based on errors induced by temporarily substituting program code of the software feature with substitute program code, observing errors induced from that substitution, and then building/obtaining an error graph for that hedge code that reflects cause-and-effect relationships between the errors induced from changes to the hedge code of the software feature. As part of this, initially a code developer/writer can label candidate hedge code as such. This can be done using a label such as #Hedge Micromodulename.Hedgecode.1, #Hedge Micromodulename.Hedgecode.2, #Hedge Micromodulename.Hedgecode.3, etc.

Provided with each candidate hedge code can also be substitute code segments for stress testing the hedge code, with the goal of inducing errors in the feature and software product generally. The substitute code segment(s) can be predefined within the program code of the software feature, for example predefined by a developer. In other examples, the substitute code is not included in the program code of the feature and is instead included elsewhere, either with the program code of the software or in an external repository.

Substitute code segments can be identified as #SubKey Micromodule.Hedgecode.1.sub.1, #SubKey Micromodule.Hedgecode.1.sub.2, #Subkey Micromodule.Hedgecode.1.sub.3, #Subkey Micromodule.Hedgecode.2.sub.1, #Subkey Micromodule.Hedgecode.2.sub.2, etc. Thus, multiple substitute code segments can be defined for a given hedge code—in this example there are three substitute code segments Hedgecode.1.sub.1, Hedgecode.1.sub.2, Hedgecode.1.sub.3 defined for hedge code 1 (Hedgecode.1) and two substitute code segments Hedgecode.2.sub.1 and Hedgecode.2.sub2 (different from the previous sub1 and sub2) defined for hedge code 2 (Hedgecode.2).

The program code of the software feature and/or software product as a whole can then be compiled such that the hedge code is substituted with a substitute code segment and the feature is ready for execution with selected input(s) for testing purposes. The substitute code segment may be written to intentionally induce errors in functionality of the feature and/or more generally the overall software when executed. Thus, after compilation the compiled version can be subjected to stress tests using inputs and with debugging enabled to realize induced errors and capture corresponding error logs. Error logs can be structured in any desired format, such as in a binary or other tree graph format. The process of substituting, compiling, and stress testing can be then be repeated with a different substitute code segment for the hedge code. The error graphs resulting from the different substitutions and stress testing can be stored in a database or other datastore and could optionally be composited together into a single 'overall' error graph representative of the errors and relationships therebetween that result from all of the substitutions and testing conducted for a particular candidate hedge code.

Sometimes it may be unclear whether a particular code segment of the program code of a particular software feature should be regarded as the hedge code of that feature. Additionally, it may not be known at the time of writing the feature which code of that feature should be considered the hedge code and therefore there may be one or more different code segments indicated or identified as being hedge code the feature, for instance. Accordingly, a process can, in one aspect, identify hedge code of a software feature in part by evaluating one or more different candidate hedge code(s) of the program code of the software feature, whether or not those candidates are explicitly identified as such by the developer. The candidates might be identified as such, either explicitly in the program code or automatically by a computer process.

Thus, in evaluating a candidate the process can iteratively substitute the candidate hedge code with a substitute code segment and test the software feature with the substitute code segment substituting for the candidate hedge code (i.e., compiled with the substitute code segment in place of the original hedge code), which testing generates error(s) that were induced from that substitution and testing. In a further aspect of the evaluation of the candidate, the process generates an error graph corresponding to that substitute code segment and reflecting the errors and dependencies induced from that substitution.

If there are multiple substitute code segments for a candidate hedge code, a single substitution may be made at a time so as to avoid introducing too many variables. The evaluation of the candidate can therefore repeat the substituting, testing, and generating an error graph for each other substitute code segment. This produces a number of generated errors graphs corresponding to the multiple substitute code segments.

Multiple different substitutions can help drive the realization of different errors that are induced by modifications to a candidate hedge code. This can provide a representative, and perhaps comprehensive, set of the types of errors induced when that candidate hedge code is modified.

Ultimately, the process of evaluating a candidate hedge code with potentially multiple different code substitutions is to generate an overall error graph for that candidate hedge code. The overall error graph is to reflect cause-and-effect relationships between errors induced from changes to the candidate hedge code. If a candidate hedge code is evaluated with just one substitute code segment, then the overall error graph for the candidate hedge code can be the error graph generated from the errors induced by just that one substitute code segment. If instead the candidate is evaluated with multiple substitute code segments, then the overall error graph for the candidate hedge code may be generated based on one or more of the errors graphs produced from testing the feature with different substitute code segments in place. The overall error graph for the candidate hedge code could be an aggregate error graph, for example, that incorporates errors induced from the substituting and testing across two or more (or the entire collection) of the substitute code segments. For instance, it might be possible to observe common error(s) across the error graphs corresponding to the different substitutions and identify different branches of errors reflected in those error graphs in order to generate an overall, larger graph that encompasses errors and relationships therebetween as reflected across many different error graphs that resulted from the testing of different substitutes in place of a candidate hedge code portion of the feature.

As noted, there may be multiple candidate hedge codes identified, each with potentially several substitute code segments selected therefor. It may be that only one such candidate is the true hedge code of the software feature. Thus, it be desired to select or confirm one such candidate to be regarded as the true hedge code for the software feature. A candidate hedge code (such as the one evaluated above) could therefore be a first candidate hedge code and the process, in identifying the hedge code of the software feature, can repeat the evaluation for each other candidate hedge code identified, i.e., evaluate each other candidate hedge code to generate an overall error graph for each of them. This repeating produces a collection of candidate hedge code error graphs, e.g., a respective overall error graph for each of the candidate hedge codes. The process can then compare those error graphs in that collection and identify from those graphs which of the candidate hedge codes most extensively induced errors, for instance which had the greatest effect in terms of cascading errors as reflected by the aggregated error graph generated with respect to that candidate hedge code. The process can select, as the true identified hedge code of the software feature, the candidate hedge code that most extensively induced errors. The error graph generated for that selected candidate hedge code by the evaluation thereof can then be taken to be the error graph for the (true) hedge code of the feature.

The above identifies hedge code for a given software feature, potentially from several candidates, and an error graph for that hedge code. Since it is common for software to include several different features, it might be desired to identify the hedge code for each of those features. This will enable a robust and comprehensive evaluation of errors that could be experienced when the software is used in production. The process can therefore repeat, for each other software feature of the software product, the identification of the hedge code of the other software feature based on errors induced from temporarily substituting program code of the other software feature with substitute program code, and the obtaining of an error graph for the hedge code of that other software feature. What results is a collection of error graphs corresponding to different software features of the product. These error graphs too could optionally be aggregated/composited into a single, aggregated software product-level error graph representative of the errors and relationships therebetween that result from the various substitutions and testing conducted across the different hedge code portions of the multiple different software features of the larger application or product. This aggregated error graph for the software product could be used as a blueprint to identify causes of a given bug or an issue with respect to any feature of the product.

Thus, a process can capture errors graphs based on modifying candidate hedge code, in which the process works with substitute code segments to, one at a time, substitute-in the substitute code segment for the hedge code, compile the program code of the feature, stress test the feature with the substitute code segment compiled therein to induce errors, log/collect the errors, and then pattern (in the form of an error graph) the errors exhibited to identify the cascading effects of code modifications to that hedge code. True hedge code of the feature is identified, and this is done for multiple different features to obtain and store multiple patterns (error graphs) in a graph database and/or an aggregated application-level error graph.

In an alternative embodiment, candidate hedge code is not explicitly identified beforehand. The process could instead guess or select various potential hedge code segments and iterate through their evaluation in an attempt to identify the true hedge code. If the error graph for a code segment is less than some threshold size, say 2 or 3 errors nodes, then the segment could summarily be deemed not hedge code.

Error graph(s) for identified hedge code segments of software program code can be useful when debugging the software or evaluating bugs/errors. A bug from a software feature of an application in use often results in error logs indicating errors with the software feature. When a bug is discovered, a process can obtain the error log(s) and generate an error graph ("application error graph") for the error codes and errors therein, i.e., reflective of the errors with the software feature. The process can then attempt to map the application error graph to one or more of the error graphs previously generated from the identified hedge code(s) of the software. In other words, the error graph resulting from the errors experienced with the application in use can be compared to one or more errors graphs generated as discussed above with respect to hedge code of the software features of the application. If the attempt to map the application error graph to a stored error graph is successful in aligning error(s) reflected in the application error graph to error(s) reflected in the error graph, the process can identify which hedge code is likely inducing a root error identified by the application error graph. In one aspect, the mapping can attempt to align the two graphs, or at least align the application error graph to at least a portion of the error graph. In this manner, the aligning does not necessarily mean that the graphs are exactly the same—the application error graph might align with just one branch, subtree or portion of the error graph, for instance. A process can compare the application error graph to the plurality of error graphs and identify which error graph of the plurality of error graphs is a best fit to the application error graph, the mapping thereby maps the application error graph to the best fit error graph. The best fit error graph corresponds to a specific software feature and therefore the process identifies that software feature, of the plurality of software features of the product, and the hedge code thereof that induces a root error identified in that application error graph.

In one example in which feature-level error graphs are not aggregated into a product-level error graph, there are multiple error graphs for different hedge code segments (correlating to one or more software features), and the process can compare the application error graph to the multiple error graphs and identify which error graph of the multiple error graphs is a best fit to the application error graph. The mapping maps the application error graph to the best fit error graph. The best fit error graph corresponds to a specific software feature and therefore the process can identify the software feature, of the plurality of software features of the software, and the hedge code thereof that induces a root error identified by the application error graph. The process therefore identifies the particular hedge code that, when modified and tested, induces errors that most closely align with those reflected in the error logs of the application.

Alternatively or additionally, if the error graphs for each feature are aggregated into an aggregate error graph of the software product, then the process can compare the application error graph to the aggregate error graph for the software product and identify a portion, of the aggregate error graph for the software product, to which the application error graph fits. That portion or subset of the aggregate error graph can be or reflect one of the errors graphs (for a specific software feature) that was aggregated with others to form the aggregate error graph. Thus, this maps the application error graph to the portion of the aggregate error graph for the software product and that portion reflects the error graph for a specific hedge code of the software feature. It thereby identifies both the software feature and the hedge code of that software feature key code that induces a root error identified in the application error graph.

This can be repeated for other bugs reflected by other errors in the error logs. Error logs for software might indicate several different errors that might be unrelated, meaning their root causes reside with different features (and therefore different hedge codes) in the software product.

In some examples a developer inserts hedge code indicators (e.g., #Hedge Micromodulename.Hedgecode.1) in program code when writing it. The developer could optionally provide substitute code segment(s) for driving errors when performing evaluation of the hedge code as described above. If a portion marked hedge code is evaluated and is confirmed to be hedge code of that feature, it is expected to drive a cascading set of errors. Often a large chunk of program code of a feature is 'wrapper' code and the true hedge code of the feature is a relatively small, discrete code portion/statement(s) that performs the most important function in terms of the feature and how the feature most affects other features of the product.

Alternatively, a process could attempt to identify hedge code of a feature automatically, for instance by automatically changing calculations in different portions of program code of a feature or commenting-out different sections of the program code and substituting other code in for those, iteratively, and compiling and running tests with different inputs to check the cascading effects of the modifications. The calculation/portion of the feature code that, when changed in this manner, has a maximum cascading effect could be selected as the hedge code for that feature.

Using an RPO example as above, below is example pseudocode for an RPO feature of an application, with example Hedgecode and substitute code segments:

```
-#Connect to the DR Backup appliance
DRTS = Get the last backed up snapshot time;
-#Connect to the production Backup appliance
ProductionTS = Get the current timestamp from the production appliance;
-#Hedgecode1.1.START
RPO = Compute Recovery Point Objective by subtracting ProductionTS from DRTS;
-#Hedgecode1.1.END
-#Substitute.Hedgecode1.1.START
RPO = Compute Recovery Point Objective by Multiplying ProductionTS and DRTS;
```

-continued

```
-#Substitute.Hedgecode1.1.END
-#Substitute.Hedgecode1.2.START
RPO = Compute Recovery Point Objective by Adding ProductionTS to
  DRTS;
-#Substitute.Hedgecode1.2.END
-Print the RPO on Dashboard;
```

In the above, the "RPO=Compute Recovery Point Objective by subtracting ProductionTS from DRTS" calculation code has been marked as the hedge code and involves subtraction of ProductionTS from DRTS. Two substitute code segments have been provided—Substitute.Hedgecode1.1 changes the subtraction to a multiplication, and Substitute.Hedgecode1.2 changes the subtraction to an addition. The application is compiled and tested with the first substitute and separately with the second substitute. The testing can last for an extended duration of time (potentially days) in order to provide time for resulting errors to cascade into other errors.

FIG. 1 depicts an example error graph 100 induced from this code substitution, in accordance with aspects described herein. The error graph can be automatically constructed by a computer system based on events/errors raised in the testing. The error graph is a binary tree in this example with six nodes 102-112. Each node represents an error event induced from this testing based on the code substitution. A parent-child relationship indicates a relation between two such events, specifically that the child event is caused by its parent, i.e., as a cascading set of error events. An RPO Deviation (root node 102) causes this to be reflected on the administrative user interface (child node 104) and a Group Event (child node 106). The Deviation on the UI (node 104) drives a Replication Error Event (node 108). Meanwhile, the Group Event (node 106) raises a Group Status Change (node 110), which triggers an alert (e.g., Mail) to the administrator (node 112). Modification of the hedge code, the RPO calculation, could result in RPO computation failure therefore inducing an RPO deviation 102 and cascading errors rooted to the RPO deviation.

An error graph as in FIG. 1 can be constructed per each hedge code. Thus, each hedge code could have its own associated error graph. The error graph for the hedge code includes a root node (e.g., 102) indicating a root cause. Some error graphs could include a much greater number of nodes and branches and may not necessarily be binary tree structures.

Figure 2:
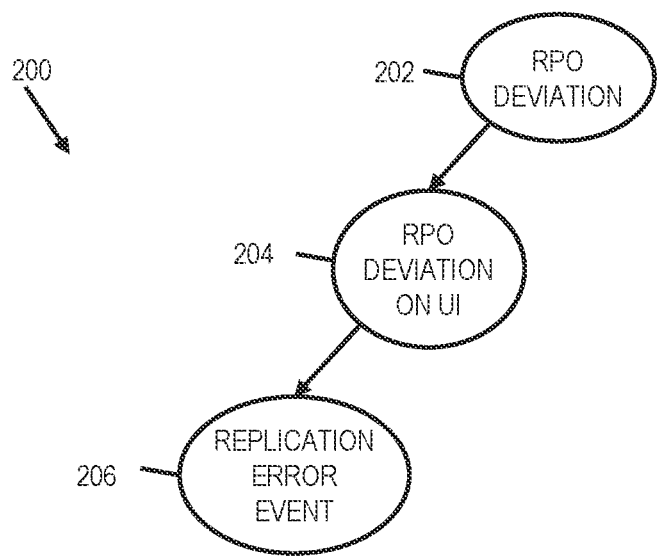
FIG. 2 depicts an example application error graph in accordance with aspects described herein.

The error graph is made available for potential mapping, individually and/or as a constituent of an aggregated error graph for the overall product, with an application error graph reflective of errors experienced in an application. When an application error graph can be mapped to an error graph of hedge code, then the errors identified in the application error graph can have, as a root cause, the root cause corresponding to the root of the hedge code (e.g., node 102). By way of example, FIG. 2 presents an example application error graph in accordance with aspects described herein. The application error graph may be generated based on error log(s). Here, the logs reflect a replication error event from an RPO deviation indicated on the UI, which itself was caused by an RPO Deviation. The built application error graph 200 includes RPO Deviation (node 202) at its root, followed by RPO Deviation on UI (node 204) and Replication Error Event (node 206). Mapping this to the error graph of FIG. 1 shows alignment with the left branch (including root node 102) of error graph 100. The root cause of the errors in this example is an issue with the RPO calculation to spawn the RPO Deviation error (and errors cascading therefrom). The error graph of FIG. 1 could be stored as a standalone error graph, or could be a subtree, rooted at 102, of a larger error graph, i.e., an aggregated error graph for the software product.

In this example, the application error graph 200 has as its root error (RPO Deviation in this example) the same root as that of hedge code error graph 100. However, this may not always be the case. For instance, in other examples the application error graph 200 may not reflect the true root (e.g., 102) in the error logs; it may instead be a subgraph (e.g., subtree) of the hedge code error graph 100. For instance, an application error graph might reflect only Group Event, Group Status Change, and Mail to Admin error events (i.e., the Group Event branch under root node 102 of FIG. 1) without reflecting any explicit RPO Deviation error per se. The logs may not have captured an explicit RPO deviation event, for instance. In any case, the apparent root is the Group Event. However, the mapping could map the application error graph to the corresponding right branch of error graph 100 by aligning the root of the application error graph (Group Event) to node 106 of FIG. 1, and consequently identify the root cause as being the root of the hedge code error graph, i.e., a defective RPO calculation. In yet another example, perhaps only a replication error event is observed in the error logs (a single node application error graph). This could still be mapped to the error graph of FIG. 1 to identify RPO deviation as the root cause.

With the root cause identified in this manner, the system can suggest to the developer the root cause, e.g., an RPO deviation from incorrect RPO calculation logic in the feature incorporating the RPO calculation logic. It could also present an indication of the program code for that calculation (i.e., the program code of the feature and the hedge code portion thereof) and, whether that hedge code was modified at some point. If so, it could provide prior version(s) of that code. This may be done automatically and electronically to electronically provide to the developer the program code of the software feature (that has the observed bug), an indication of the hedge code of the software feature (i.e., the troubled code that is the root cause of the errors), and a code revision history of that hedge code of the software feature to facilitate developer revision of the program code of the software feature.

When a bug is discovered in a feature, the developer(s) currently responsible for the fix could benefit from automated guidance as to a root cause. This might be especially useful in cases that the developer does not have prior experience with the code of this feature. It might save the developer from a conventional practice of otherwise parsing through a larger set of program code or looking for hints in the errors logs to identify the cause, which such practice can lead to difficulties, for instance if the developer identifies a wrong root cause and attempts fixes against that incorrectly determined root cause. In contrast, identification of hedge code for each feature as described herein facilitates an immediate focus on the likely root cause of the issue, which can be extremely advantageous to a developer who is not familiar with the feature.

Provided in accordance with this disclosure are systems and methods to identify hedge code for feature/micromodules/microservices and trace bugs/defects this based on cause-and-effects of the code. An example process identifies the hedge code of application features, uses multiple test pieces of code (substitute code segments, which could be mostly or all written to induce a failure or defective in the hedge code) per hedge code in respective iterations of testing, records the results and error patterns per feature and per hedge code, publishes these findings in the form of error graph(s) in a repository, and then uses them when bugs are identified in a feature of the application. Error logs are analyzed to identify the corresponding hedge code and pattern (error graph or portion thereof) that map to the errors reflected in the error logs. This helps the developer identify the hedge code, of the feature, reflecting the root cause of the issue.

Also provided are systems and methods to automatically detect and suggest potential code modifications, such as to restore hedge code or program code of the feature to a prior version of the hedge code/feature code if a recent modification thereto is the root cause of experienced errors. Additional aspects provide for identification of hedge code by inducing defects using substitute code segment(s) and running tests to induce and cascade errors for representation as errors graphs. Hedge code flows of features can be tracked by inducing errors (via substitute code and potentially erroneous data). When a defect is discovered and traced using the error graph mapping approach, problematic hedge code can be identified and reported to the developer.

Advantageously, aspects facilitate integration of new development team members because they can be directed to probably root causes fast and automatically (e.g., by a computer system). Response times, estimated time of arrival (ETA) of fixes can be reduced and fixes directed to the production/customer environment might be identified quicker. Additionally, in some aspects regression might be more easily and automatically identified based on the errors graphs and root causes identified, thereby enabling upfront planning of regression testing to be conducted.

Figure 3A:
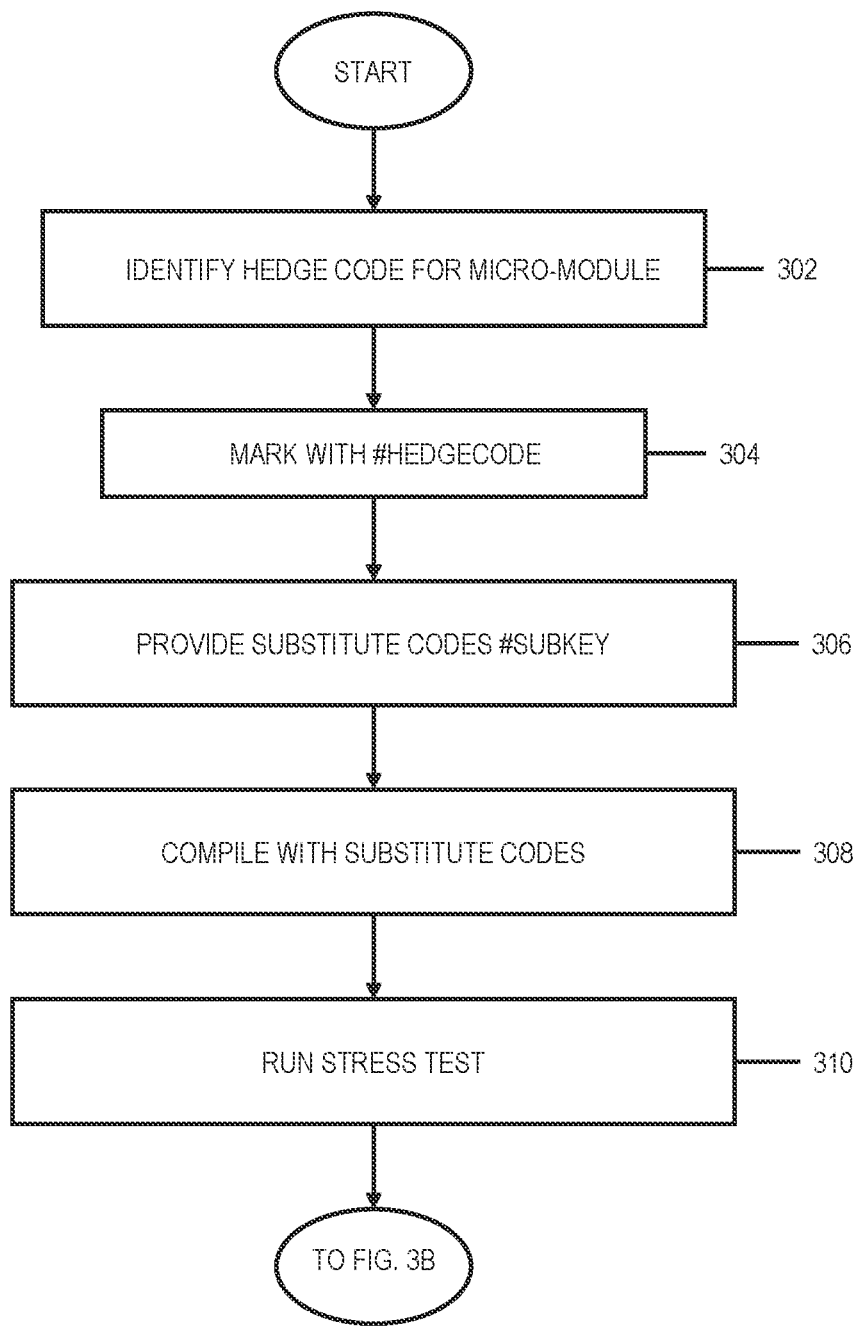
FIGS. 3A-3B depicts an example process flow for evaluating hedge code of a software feature, in accordance with aspects described herein.
Figure 3B:
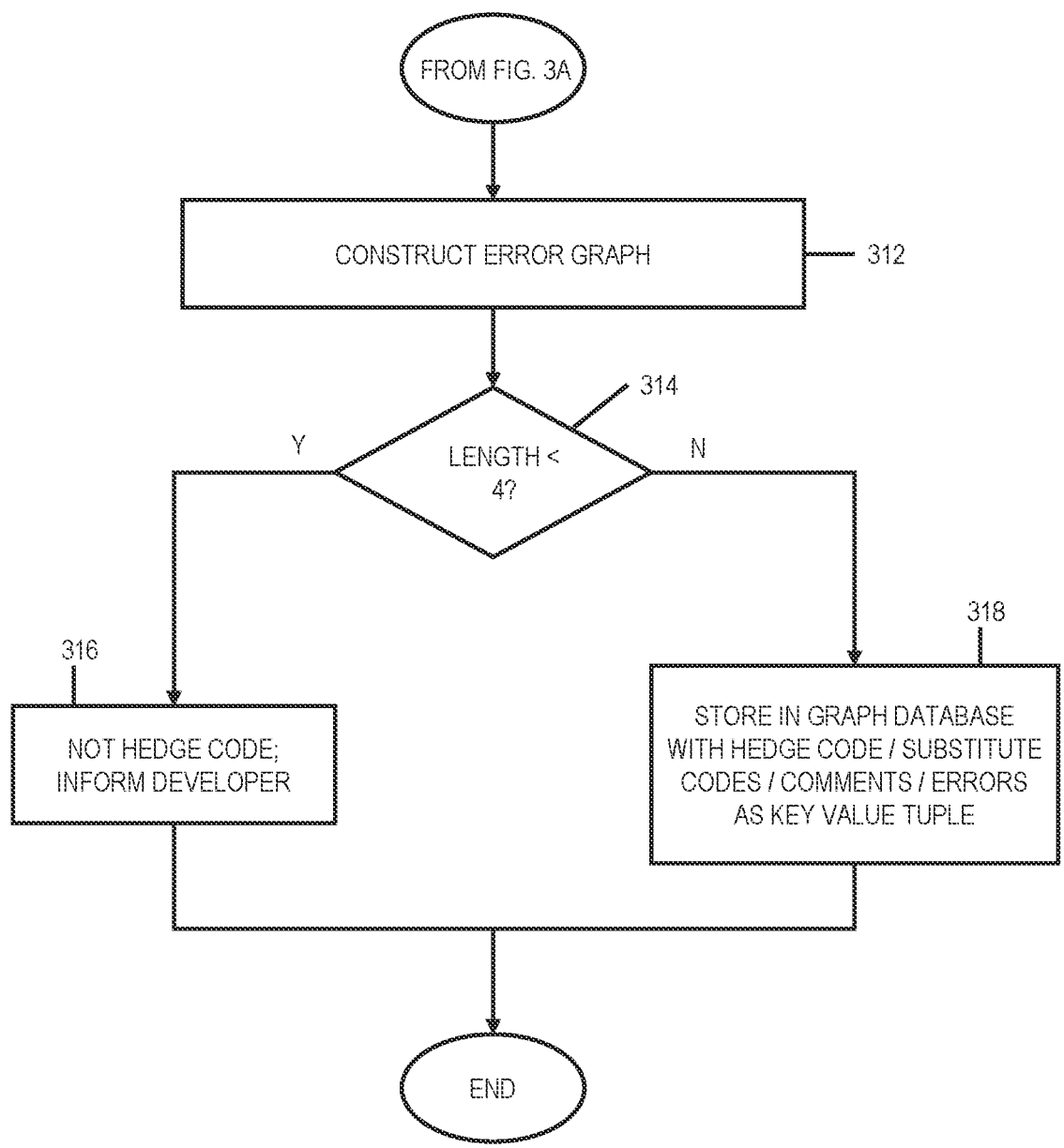

FIGS. 3A-3B depicts an example process flow for evaluating hedge code of a software feature, in accordance with aspects described herein. The flow could be performed in whole or in part by a computer system such as those described herein.

Referring to FIG. 3A, the process identifies (302) hedge code (for instance a candidate) for a micro-module or any other type of software feature. It marks (304) the hedge code with an identifier, such as #HEDGECODE and provides (306) substitute code segments using an identifier, such as #SUBKEY. It compiles (308) the feature with each different substitute code segment substituted in for the identified hedge code (possibly in conjunction with compiling other features of the software) and runs (310) the stress testing to induce and log errors.

At this point (referring to FIG. 3B), the process generates and potentially stores an appropriate error graph based on the testing (FIG. 3A, #310). Referring to FIG. 3B, the process constructs (312) the error graph, for instance an overall error graph corresponding to the hedge code and based on the errors induced by the substituting and stress testing of FIG. 3A. The process inquires (314) whether the constructed error graph for this hedge code is less than 4 nodes in length. In this example, graph size is determinative of whether the candidate hedge code should be regarded as true hedge code and its error graph retained for potential mapping to an application error graph for root cause analysis. If the error graph is less than 4 nodes in length (314, Y), then the process determines (316) that the hedge code is not true hedge code and informs the developer. Otherwise, (314, N), the hedge code is regarded as true hedge code and the process stores (318) the error graph in a database as a tuple with a copy of the hedge code, the substitute code segments used in the testing, any applicable comments, and the errors induced from the testing. It may be desirable to perform the process of FIGS. 3A-3B periodically or aperiodically, for instance at each iteration of a software or feature update. This can be done to update the error graph in case a code update results in changes to the error graph. In this manner, software/feature version can be an attribute of each error graph generated/stored per FIGS. 3A-3B. Optionally, the error graph generated and stored can be aggregated with other error graphs (e.g., for other edge codes of other features) to produce an aggregate error graph for the software product.

Figure 4:
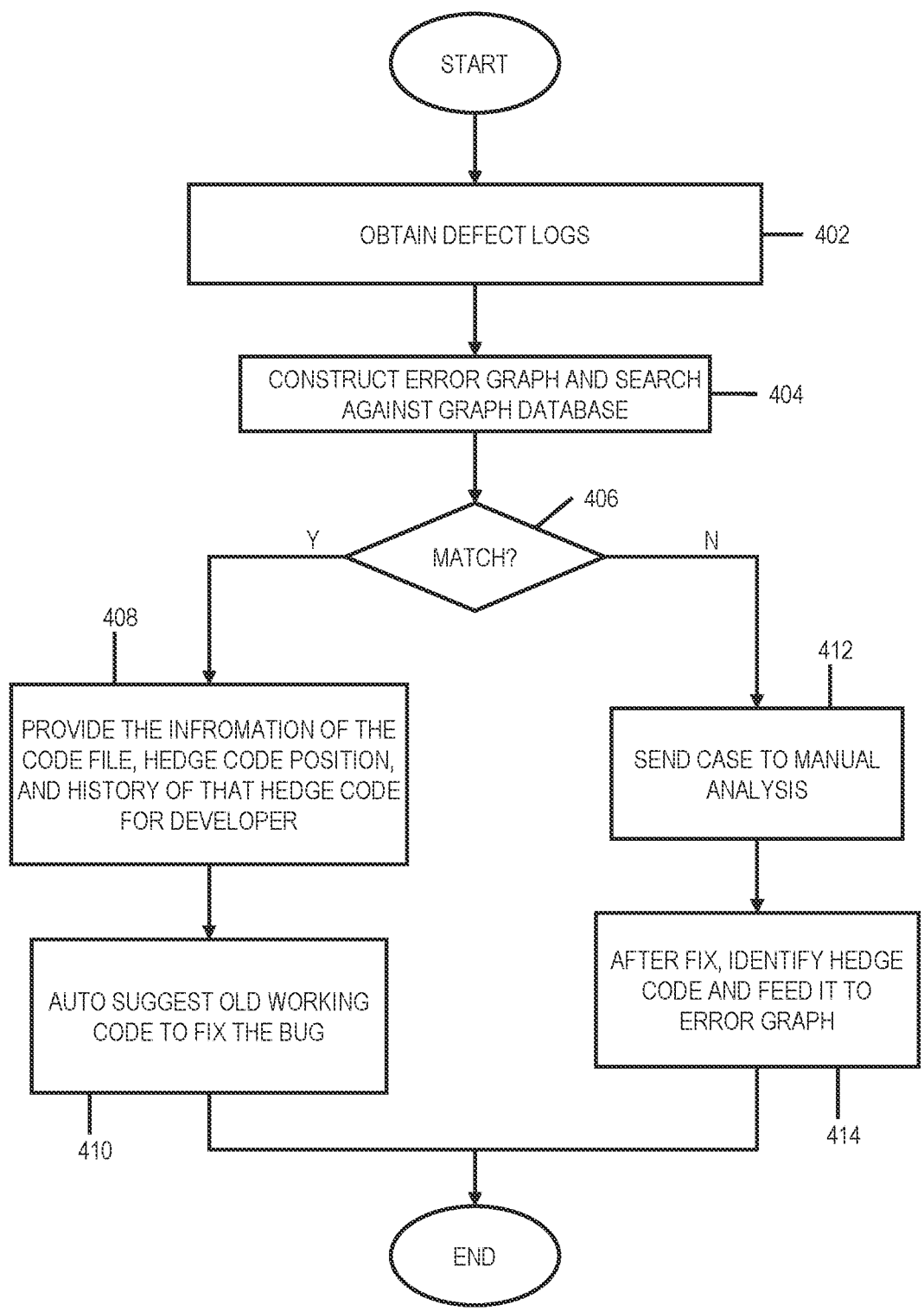
FIG. 4 depicts an example process flow for identification of a root cause of a software defect based on error graph mapping, in accordance with aspects described herein

FIG. 4 depicts an example process flow for identification of a root cause of a software defect based on error graph mapping, in accordance with aspects described herein. The flow could be performed in whole or in part by a computer system such as those described herein. The process obtains (402) errors logs from a customer or other source and constructs (404) the application error graph and searches the graph database (of 318) to see whether the constructed application error graph maps to an error graph in the graph database. The process determines (406) whether there is a match/map, and if so (406, Y), the process provides (408) information of the code file, position of the hedge code associated with that error graph to which the application error graph mapped, and a development history of that hedge code. In this example, the process also automatically suggests (410) to the developer an old working version of the hedge code that is known not to have caused the same errors. If instead at 406 it is determined that there is no match between the application error graph and any error graph in the graph database (406, N), the process instead sends (412) the case for manual analysis and then, after a fix is implemented, identifies (414) that code portion as being hedge code and feeds it for evaluation and error graph generation (FIGS. 3A, 3B).

Figure 5:
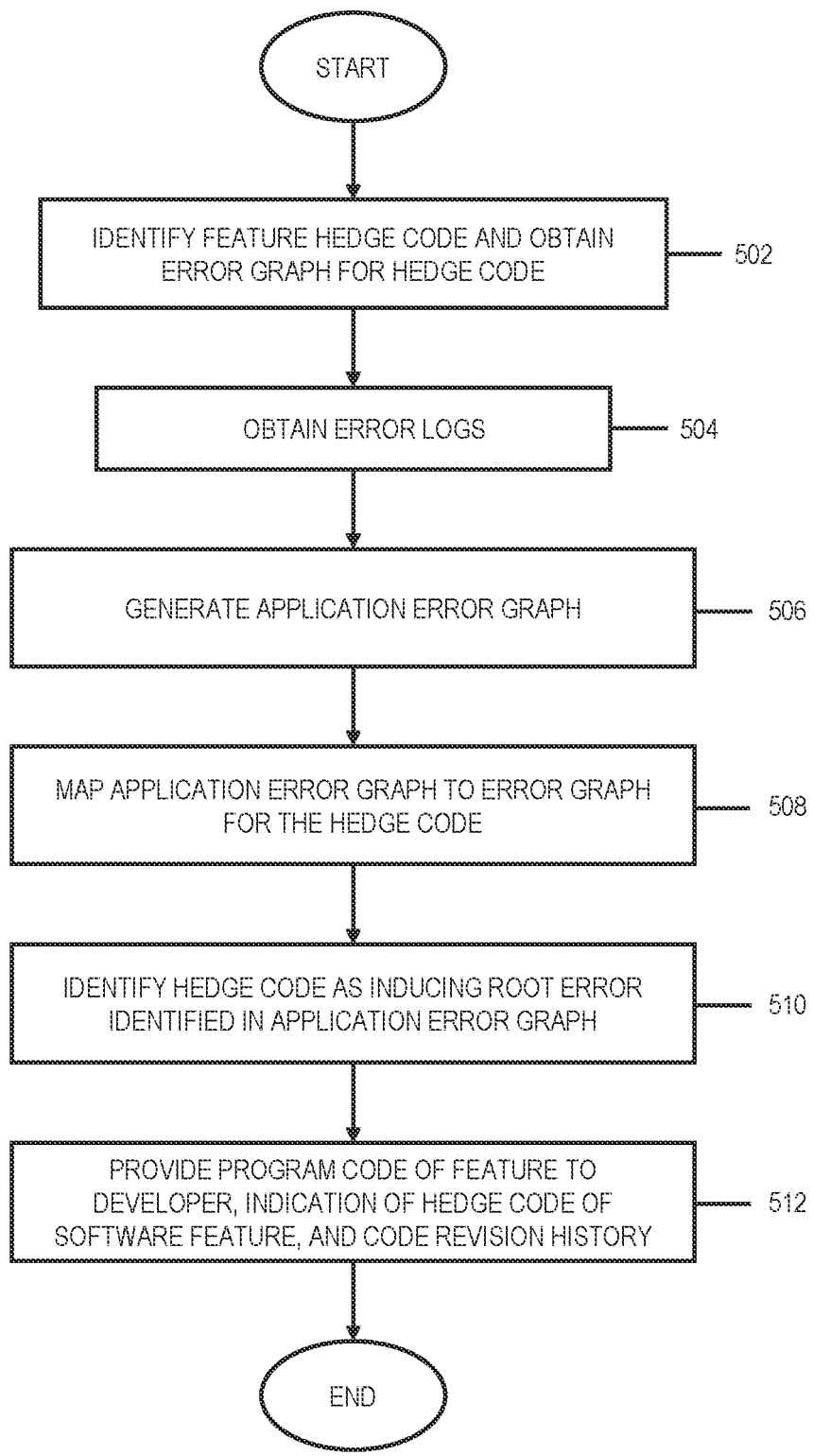
FIGS. 5-6 depict example processes for root cause identification of software defects based on hedge code identification, in accordance with aspects described herein.
Figure 6:
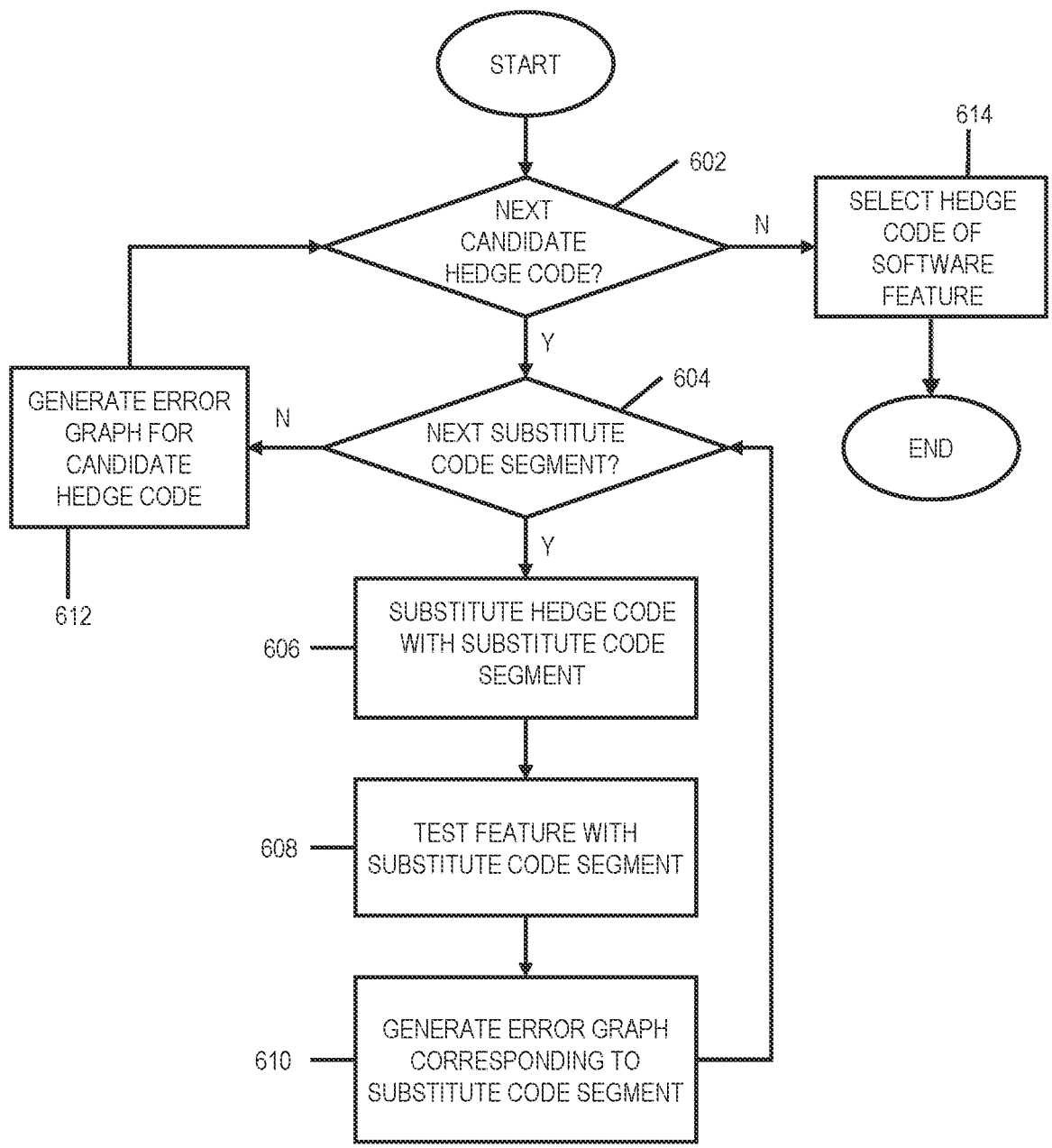

FIGS. 5-6 depict example processes for root cause identification of software defects based on hedge code identification, in accordance with aspects described herein. In some examples, the processes are performed by one or more computer systems, such as those described herein.

Referring initially to FIG. 5, the process at 502 identifies, in program code of a software feature, hedge code of the software feature (an example of such identification being provided by FIG. 6) and obtains an error graph for the hedge code. This identification of the hedge code is based on errors induced from temporarily substituting program code of the software feature with substitute program code. The error graph for the hedge code reflects cause-and-effect relationships between errors induced from changes to the hedge code of the software feature. A substitute code segment can be predefined within the program code of the software feature by a developer, as an example, or could be suggested or selected in another manner, perhaps automatically by the process. The error graph for the hedge code can include a root node indicating a root cause to which the hedge code corresponds.

FIG. 6 depicts an example process for identifying hedge code of a software feature. The identification of the true hedge code of a software feature can be based on evaluating each of one or more candidates that may potentially be regarded the hedge code. The process of FIG. 6 iterates through each candidate as follows. The process begins by entering a loop (outer loop) that initially determines at 602 whether there is a next candidate hedge code to evaluate. If evaluation of candidate(s) just began, the inquiry 602 will be answered in the positive (602, Y) and the method proceeds by selecting that next candidate and entering a second (inner) loop to iterate through one or more substitute code segments for that candidate hedge code. Specifically, the process determines (604) whether there is a next substitute code segment to evaluate. If evaluation of the substitute code segment(s) for the candidate just began, i.e., this is the first substitute code segment, the inquiry 604 will be answered in the positive (604, Y) and the process proceeds by substituting (606) the candidate hedge code with that substitute code segment, then testing (608) the software feature with the substitute code segment substituting for the candidate hedge code. The testing may require that the code first be compiled and possibly integrated with other compiled code. In any case, one or more errors are induced from the substituting (606) and testing (608).

The process then generates (610) an error graph corresponding to that substitute code segment. At that point, the process returns back to 604 to determine whether there is a next substitute code segment to process. If so (604, Y), the process iterates to repeat the substituting (606), testing (608) and error graph generating (610) for that next substitute code segment. It loops as such for each substitute code segment for the candidate hedge code, thereby producing a plurality of generated error graphs corresponding to the plurality of substitute code segments for that candidate hedge code.

At some point there are no more substitute code segments to process (604, N) for the candidate. The process proceeds to 612 where it generates an error graph for the candidate hedge code. The error graph for the candidate hedge code reflects cause-and-effect relationships between errors induced from changes to the candidate hedge code, i.e., the changes being the substitutions that were performed at 608. For any candidate hedge code, a final error graph is produced for that candidate. If just one substitute code segment is tested, then this final error graph could be the error graph corresponding to that segment. Otherwise, if a plurality of substitute code segments are tested, then the final error graph will be selected/produced. In one specific example, the generated error graph for the candidate hedge code is an aggregate error graph incorporating errors induced from the substituting and testing across the plurality of substitute code segments.

Based on generating the error graph at 612, the process proceeds to determine (602) again whether there is a next candidate hedge code to process. If so (602, Y), the process iterates/repeats to evaluate and generate an error graph for the next candidate hedge code. This situation produces a plurality of error graphs for the candidate hedge codes.

When there are no more candidate hedge codes to evaluate (602, N), the process selects (614) which candidate hedge code is the true hedge code of the software feature. If there is only one candidate, the selection is straightforward; it is that candidate.

Otherwise, the process, in selecting the hedge code for the program feature, compares the plurality of error graphs for the candidate hedge codes to identify which of the candidate hedge codes most extensively induced errors (e.g., had the greatest cascading of errors and selects, as the identified hedge code of the software feature (502, FIG. 5), the candidate hedge code that most extensively induced errors. In that case, the obtained error graph (502, FIG. 5) for the hedge code is the error graph that was generated (at 610) for the selected candidate hedge code.

It is noted that aspects of FIG. 6 could be performed periodically or aperiodically, for instance after any or each update to program code of the software and/or feature, update to the code segment(s) considered to be candidate hedge codes, and/or update to substitute code segments of any candidate hedge code, as examples. It may be desired in that case to perform the entirety or a portion of the process of FIG. 6 in order to update error graph(s) generated (e.g., at 610, 612) and potentially re-select (614) which candidate is the true hedge code of the software feature.

Returning to the process of FIG. 5, with the identification of the hedge code for the software feature and error graph obtained and based on discovery of some bug with the software feature, the process at that point obtains (504) error logs of an application that incorporates the software feature. The error logs indicate errors with the software feature of the application.

The process automatically generates (506) an application error graph reflective of those errors with the software feature of the application, and maps (508) the application error graph to the error graph for the hedge code that was obtained at 502. The mapping could be a process that identifies an error graph, of multiple different error graphs, to which the application error graph best fits or that identifies an error graph as being a subgraph of a larger error graph that is aggregated from several constituent error graphs, as explained below. Based on the mapping successfully aligning one of more errors reflected in the application error graph to one or more errors reflected in the error graph for the hedge code, the process identifies (510) that hedge code as inducing a root error identified in the application error graph. In other words, the alignment informs that the errors reflected in the log align with errors induced by modification/defects in the hedge code to which the error graph corresponds.

The root error identified in the application error graph can then be presented as having, as a root cause, the root cause corresponding to the identified hedge code. Thus, the process electronically provides (512) to a developer the program code of the software feature, an indication of the hedge code of the software feature, and optionally a code revision history of that hedge code of the software feature, which can facilitate developer revision of the program code of the software feature to address the bug/errors reflected in the logs.

Since an application can have several features, the process could perform the identification of hedge code and obtaining an error graph (502) for each of those features resulting in a plurality of error graphs. The process, as part of the mapping (508) or prior, can perform a comparison in one of two example forms. In one embodiment, the process compares the application error graph to the plurality of error graphs and identifies which error graph of the plurality of error graphs is a best fit to the application error graph. The mapping (508) maps the application error graph to the best fit error graph and identifies the software feature, of the plurality of software features, and hedge code thereof that induces a root error identified in the application error graph. In another embodiment, an aggregate error graph for the software product is aggregated from the plurality of error graphs into a single, larger, error graph for the software product (i.e., multiple features thereof). The process compares the application error graph to this aggregate error graph for the software product and identifies a portion, of the aggregate error graph for the software product, to which the application error graph fits. That portion is associated with one of the plurality of error graphs, i.e. associated with a particular feature/hedge code. The mapping (508) thereby maps the application error graph to that portion of the aggregate error graph for the software product, which portion reflects the error graph for the hedge code of the software feature. On the basis of that mapping, it identifies the software feature, of the plurality of software features, and hedge code thereof that induces a root error identified in the application error graph.

In yet another aspect, the error logs might reflect errors that are not related or that are indicative of defects in multiple different features. The process could therefore automatically generate, based on the error logs, one or more other application error graphs reflective of other errors with one or more other software features of the application and, for each of the one or more other application error graphs, repeat the comparison to identify a software feature, of the plurality of software features, and hedge code thereof that induces a root error identified in the other application error graph.

Although various examples are provided, variations are possible without departing from a spirit of the claimed aspects.

Figure 7:
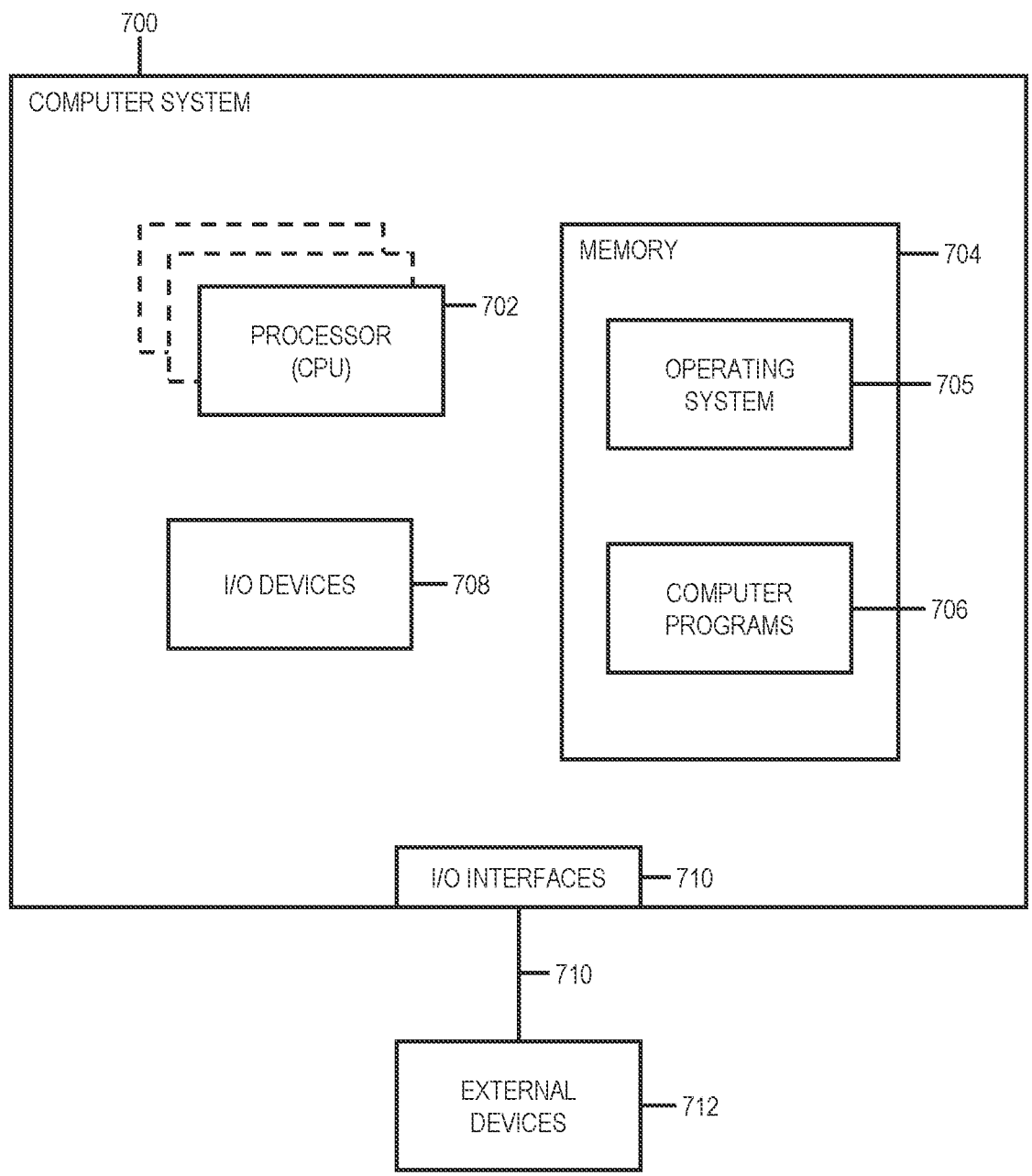
FIG. 7 depicts one example of a computer system and associated devices to incorporate and/or use aspects described herein.

Processes described herein may be performed singly or collectively by one or more computer systems. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code, or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s)

such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
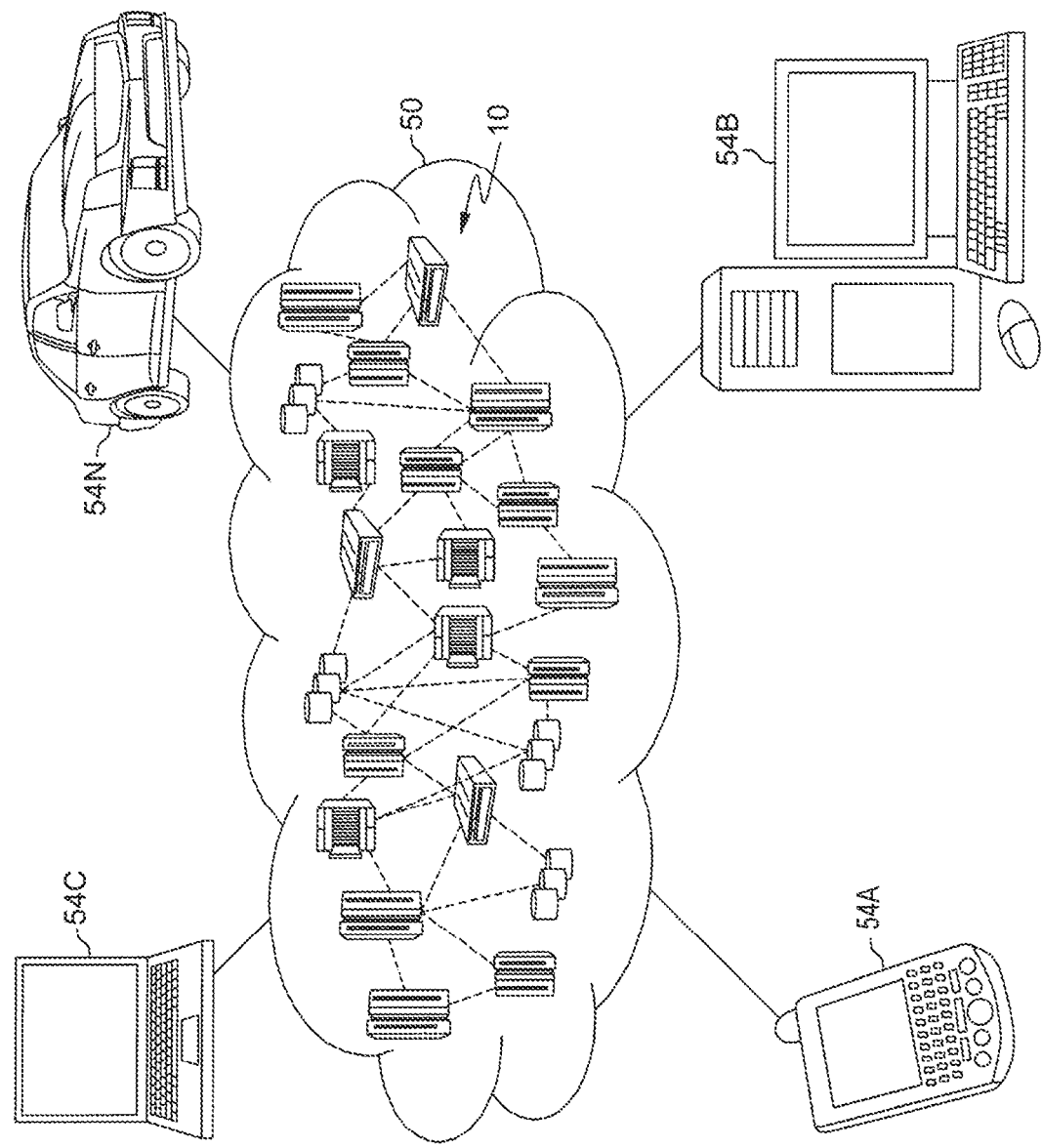
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
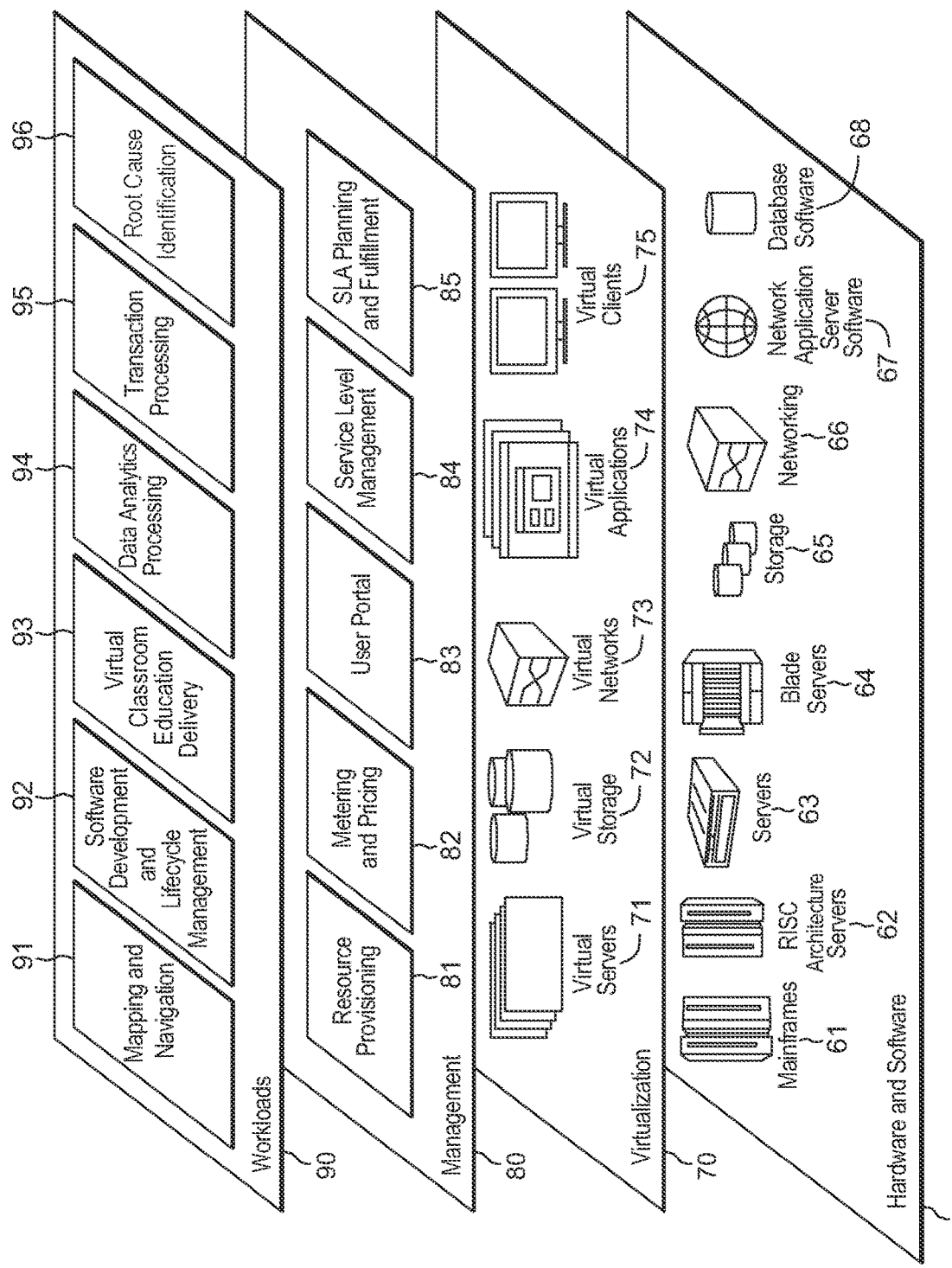
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and root cause identification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    inducing errors in program code of a software feature by temporarily substituting program code of the software feature with substitute program code;
    identifying, in program code of the software feature, hedge code of the software feature based on errors induced from temporarily substituting program code of the software feature with substitute program code, and obtaining an error graph for the hedge code, the error graph for the hedge code reflecting cause-and-effect relationships between errors induced from changes to the hedge code of the software feature;
    obtaining error logs of an application that incorporates the software feature, the error logs indicating errors with the software feature of the application;
    automatically generating an application error graph reflective of the errors with the software feature of the application;
    mapping the application error graph to the error graph for the hedge code; and
    based on the mapping aligning one of more errors reflected in the application error graph to one or more errors reflected in the error graph for the hedge code, identifying the hedge code as inducing a root error identified in the application error graph.

2. The method of claim 1, wherein the error graph for the hedge code comprises a root node indicating a root cause to which the candidate hedge code corresponds, wherein the root error identified in the application error graph has, as a root cause, the root cause corresponding to the candidate hedge code.

3. The method of claim 1, wherein the method further comprises electronically providing to a developer of the program code of the software feature, an indication of the hedge code of the software feature, and a code revision history of that hedge code of the software feature to facilitate developer revision of the program code of the software feature.

4. The method of claim 1, wherein the identifying the hedge code of the software feature comprises evaluating a candidate hedge code of the program code of the software feature, the evaluating comprising:
  substituting the candidate hedge code with a substitute code segment;
  testing the software feature with the substitute code segment substituting for the candidate hedge code, the testing generating one or more errors induced from the substituting and testing; and
  generating an error graph for the candidate hedge code, the error graph for the candidate hedge code reflecting cause-and-effect relationships between errors induced from changes to the candidate hedge code.

5. The method of claim 4, wherein the evaluating the candidate hedge code further comprises generating an error graph corresponding to the substitute code segment, wherein the substitute code segment is a first substitute code segment, of a plurality of substitute code segments, for the candidate hedge code, and wherein the evaluating the candidate hedge code further comprises: repeating, for each other substitute code segment of the plurality of substitute code segments, the substituting with the other substitute code segment, the testing with the other substitute code segment, and the generating an error graph corresponding to the other substitute code segment, wherein the repeating produces a plurality of generated error graphs corresponding to the plurality of substitute code segments.

6. The method of claim 5, wherein the generated error graph for the candidate hedge code comprises an aggregate error graph incorporating errors induced from the substituting and testing across the plurality of substitute code segments.

7. The method of claim 4, wherein the substitute code segment is predefined within the program code of the software feature by a developer.

8. The method of claim 4, wherein the candidate hedge code is a first candidate hedge code, of a plurality of candidate hedge codes, of the program code of the software feature, and wherein the identifying the hedge code of the software feature further comprises:
  repeating, for each other candidate hedge code of the plurality of candidate hedge codes, to generate an error graph for each other candidate hedge code, wherein the repeating produces a plurality of error graphs for the candidate hedge codes;
  comparing the plurality of error graphs for the candidate hedge codes to identify which of the candidate hedge codes most extensively induced errors; and
  selecting, as the identified hedge code of the software feature, the candidate hedge code that most extensively induced errors, wherein the obtained error graph for the hedge code is the error graph generated for the selected candidate hedge code by the evaluating of the selected candidate hedge code.

9. The method of claim 1, wherein the software feature is one feature of a plurality of software features of a software product, and wherein the method further comprises:
  repeating, for each other software feature of the software product, the identifying the hedge code of the other software feature based on errors induced from temporarily substituting program code of the other software feature with substitute program code, and obtaining an error graph for the hedge code of the other software feature, wherein the repeating produces a plurality of error graphs for the plurality of software features; and
  performing a comparison comprising one selected from the group consisting of:
    comparing the application error graph to the plurality of error graphs and identifying which error graph of the plurality of error graphs is a best fit to the application error graph, wherein the mapping maps the application error graph to the best fit error graph and identifies the software feature, of the plurality of software features, and hedge code thereof that induces a root error identified in the application error graph; and
    comparing the application error graph to an aggregate error graph for the software product, the aggregate error graph for the software product being aggregated from the plurality of error graphs, and identifying a portion, of the aggregate error graph for the software product, to which the application error graph fits, wherein the mapping maps the application error graph to the portion of the aggregate error graph for the software product and that portion reflects the error graph for the hedge code of the software feature and the mapping identifies the software feature, of the plurality of software features, and hedge code thereof that induces a root error identified in the application error graph.

10. The method of claim 9, wherein the method further comprises automatically generating, based on the error logs, one or more other application error graphs reflective of other errors with one or more other software features of the application, and, for each of the one or more other application error graphs, performing the comparison using the other application error graph.

11. A computer system comprising:
  a memory; and
  a processor in communication with the memory, wherein the computer system is configured to perform a method comprising:
  inducing errors in program code of a software feature by temporarily substituting program code of the software feature with substitute program code;
  identifying, in program code of the software feature, hedge code of the software feature based on errors induced from temporarily substituting program code of the software feature with substitute program code, and obtaining an error graph for the hedge code, the error graph for the hedge code reflecting cause-and-effect relationships between errors induced from changes to the hedge code of the software feature;
  obtaining error logs of an application that incorporates the software feature, the error logs indicating errors with the software feature of the application;
  automatically generating an application error graph reflective of the errors with the software feature of the application;
  mapping the application error graph to the error graph for the hedge code; and
  based on the mapping aligning one of more errors reflected in the application error graph to one or more errors reflected in the error graph for the hedge code, identifying the hedge code as inducing a root error identified in the application error graph.

12. The computer system of claim 11, wherein the error graph for the hedge code comprises a root node indicating a root cause to which the candidate hedge code corresponds, wherein the root error identified in the application error graph has, as a root cause, the root cause corresponding to the candidate hedge code.

13. The computer system of claim 11, wherein the identifying the hedge code of the software feature comprises evaluating a candidate hedge code of the program code of the software feature, the evaluating comprising:
- substituting the candidate hedge code with a substitute code segment;
- testing the software feature with the substitute code segment substituting for the candidate hedge code, the testing generating one or more errors induced from the substituting and testing; and
- generating an error graph for the candidate hedge code, the error graph for the candidate hedge code reflecting cause-and-effect relationships between errors induced from changes to the candidate hedge code.

14. The computer system of claim 13, wherein the evaluating the candidate hedge code further comprises generating an error graph corresponding to the substitute code segment, wherein the substitute code segment is a first substitute code segment, of a plurality of substitute code segments, for the candidate hedge code, and wherein the evaluating the candidate hedge code further comprises: repeating, for each other substitute code segment of the plurality of substitute code segments, the substituting with the other substitute code segment, the testing with the other substitute code segment, and the generating an error graph corresponding to the other substitute code segment, wherein the repeating produces a plurality of generated error graphs corresponding to the plurality of substitute code segments, and wherein the generated error graph for the candidate hedge code comprises an aggregate error graph incorporating errors induced from the substituting and testing across the plurality of substitute code segments.

15. The computer system of claim 13, wherein the candidate hedge code is a first candidate hedge code, of a plurality of candidate hedge codes, of the program code of the software feature, and wherein the identifying the hedge code of the software feature further comprises:
- repeating, for each other candidate hedge code of the plurality of candidate hedge codes, to generate an error graph for each other candidate hedge code, wherein the repeating produces a plurality of error graphs for the candidate hedge codes;
- comparing the plurality of error graphs for the candidate hedge codes to identify which of the candidate hedge codes most extensively induced errors; and
- selecting, as the identified hedge code of the software feature, the candidate hedge code that most extensively induced errors, wherein the obtained error graph for the hedge code is the error graph generated for the selected candidate hedge code by the evaluating of the selected candidate hedge code.

16. A computer program product comprising:
- a computer readable storage medium readable by a processing circuit and storing instructions for execution by the processing circuit for performing a method comprising:
- inducing errors in program code of a software feature by temporarily substituting program code of the software feature with substitute program code;
- identifying, in program code of the software feature, hedge code of the software feature based on errors induced from temporarily substituting program code of the software feature with substitute program code, and obtaining an error graph for the hedge code, the error graph for the hedge code reflecting cause-and-effect relationships between errors induced from changes to the hedge code of the software feature;
- obtaining error logs of an application that incorporates the software feature, the error logs indicating errors with the software feature of the application;
- automatically generating an application error graph reflective of the errors with the software feature of the application;
- mapping the application error graph to the error graph for the hedge code; and
- based on the mapping aligning one of more errors reflected in the application error graph to one or more errors reflected in the error graph for the hedge code, identifying the hedge code as inducing a root error identified in the application error graph.

17. The computer program product of claim 16, wherein the error graph for the hedge code comprises a root node indicating a root cause to which the candidate hedge code corresponds, wherein the root error identified in the application error graph has, as a root cause, the root cause corresponding to the candidate hedge code.

18. The computer program product of claim 16, wherein the identifying the hedge code of the software feature comprises evaluating a candidate hedge code of the program code of the software feature, the evaluating comprising:
- substituting the candidate hedge code with a substitute code segment;
- testing the software feature with the substitute code segment substituting for the candidate hedge code, the testing generating one or more errors induced from the substituting and testing; and
- generating an error graph for the candidate hedge code, the error graph for the candidate hedge code reflecting cause-and-effect relationships between errors induced from changes to the candidate hedge code.

19. The computer program product of claim 18, wherein the evaluating the candidate hedge code further comprises generating an error graph corresponding to the substitute code segment, wherein the substitute code segment is a first substitute code segment, of a plurality of substitute code segments, for the candidate hedge code, and wherein the evaluating the candidate hedge code further comprises: repeating, for each other substitute code segment of the plurality of substitute code segments, the substituting with the other substitute code segment, the testing with the other substitute code segment, and the generating an error graph corresponding to the other substitute code segment, wherein the repeating produces a plurality of generated error graphs corresponding to the plurality of substitute code segments, and wherein the generated error graph for the candidate hedge code comprises an aggregate error graph incorporating errors induced from the substituting and testing across the plurality of substitute code segments.

20. The computer program product of claim 18, wherein the candidate hedge code is a first candidate hedge code, of a plurality of candidate hedge codes, of the program code of the software feature, and wherein the identifying the hedge code of the software feature further comprises:
- repeating, for each other candidate hedge code of the plurality of candidate hedge codes, to generate an error graph for each other candidate hedge code, wherein the repeating produces a plurality of error graphs for the candidate hedge codes;
- comparing the plurality of error graphs for the candidate hedge codes to identify which of the candidate hedge codes most extensively induced errors; and
- selecting, as the identified hedge code of the software feature, the candidate hedge code that most extensively induced errors, wherein the obtained error graph for the hedge code is the error graph generated for the selected candidate hedge code by the evaluating of the selected candidate hedge code.

\* \* \* \* \*